United States Patent [19]
Aoyagi

[11] Patent Number: 4,740,065
[45] Date of Patent: Apr. 26, 1988

[54] LENS MOUNTING
[75] Inventor: Masao Aoyagi, Kanagawa, Japan
[73] Assignee: Canon Kabushiki Kaisha
[21] Appl. No.: 852,138
[22] Filed: Apr. 15, 1986
[30] Foreign Application Priority Data
Apr. 23, 1985 [JP] Japan .............................. 60-60890[U]
[51] Int. Cl.[4] .......................... G02B 7/02; G03B 17/00
[52] U.S. Cl. ..................................... 350/429; 354/286
[58] Field of Search ............... 350/429, 247, 252, 255, 350/257; 354/286

[56] References Cited
U.S. PATENT DOCUMENTS

| 3,968,504 | 7/1976 | Komine | 354/286 |
| 4,326,783 | 4/1982 | Kawamura et al. | 354/286 |
| 4,336,991 | 6/1982 | Isobe | 350/257 |
| 4,639,112 | 1/1987 | Nakai et al. | 354/286 |

FOREIGN PATENT DOCUMENTS
56-77807  6/1981  Japan .

Primary Examiner—John K. Corbin
Assistant Examiner—Loha Ben
Attorney, Agent, or Firm—Toren, McGeady & Associates

[57] ABSTRACT

An arrangement for adjusting the position of a lens held in a barrel in a lens mounting for performing optical function such as focusing or zooming by moving an optical member or members along an optical axis as in the interchangeable objective. The barrel is divided into two parts each containing a lens, and the relative positions of the first and second barrels are infinitely adjusted by a cam.

3 Claims, 4 Drawing Sheets

LENS MOUNTING

BACKGROUND OF THE INVENTION

1. Field of the Invention

This invention relates to an adjusting device for a lens mounting which enables the separation between optical elements and the fall of an optical member in a direction perpendicular to the optical axis to be adjusted.

2. Description of the Prior Art

As a conventional example, there is Japanese Laid-Open Patent Application No. SHO 56-77807 (entitled "Lens Separation Adjusting Device"), in which an end surface of the axial length of one lens barrel is provided with a plurality of stair-like stepped portions, and an end surface of the axial length of another lens barrel is provided with a projected portion corresponding to the aforesaid stepped portion, so that when these two barrels are connected to each other, the aforesaid projected portion abuts on the one of the step surfaces of the aforesaid stepped portions which provides the required lens separation. Because the axial distance between the successive two of the stepped portions is relatively long, there is a drawback that infinitely fine spacing adjustment is impossible to carry out.

Also, after the spacing has been adjusted to the prescribed value, both barrels are fixedly secured to each other by set screws on the outer periphery thereof. Therefore, there is another drawback that the tightening on the outer periphery causes deformation of the barrel, giving a bad influence on the optical performance.

SUMMARY OF THE INVENTION

An object of the present invention is to improve the drawbacks of the above-described conventional device, and to provide a lens mounting which enables the spacing between two optical elements to be adjusted in the axial direction while observing the optical performance by the measuring instrument.

To achieve this object, in a lens mounting according to the invention, one end of a first barrel is provided with first and second camming surfaces of similar form to each other positioned in axially displaced concentric relation, and one end portion of the outer surface of a second barrel is provided with an engagement portion having a third camming surface in contact with the aforesaid second camming surface, and a fourth camming surface almost similar to the third camming surface, whereby when the second barrel is turned about the optical axis relative to the first barrel, the second barrel moves axially forward or backward. Thus, the spacing between optical elements in the first and second barrels can be infinitely adjusted to establish a best optical performance.

DETAILED DESCRIPTION OF THE PREFERRED EMBODIMENT

FIGS. 1 to 5 illustrate an embodiment of the invention applied to the relay barrel of a zoom lens mounting.

Figure 1:
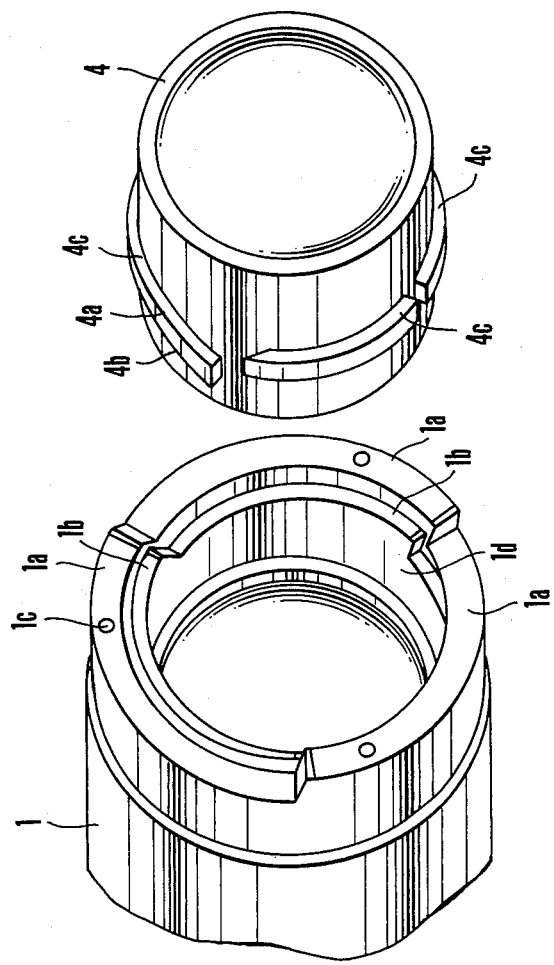
FIG. 1 is a perspective view of a relay lens barrel.
Figure 2:
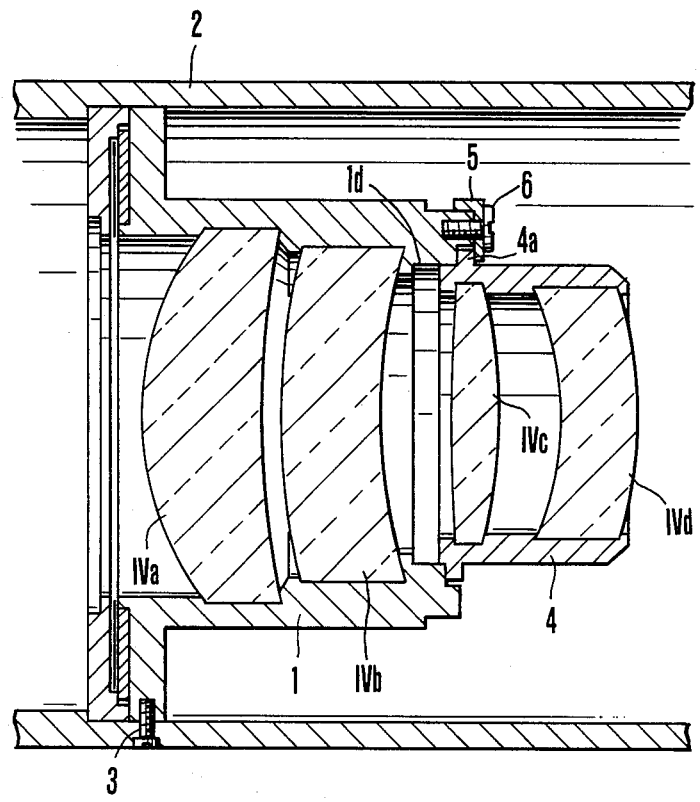
FIG. 2 is a sectional view of the barrel of FIG. 1.
Figure 3:
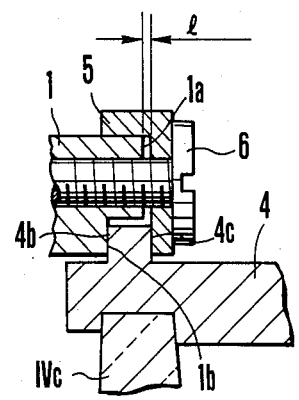
FIG. 3 is a sectional view in enlarged scale of the main part of FIG. 2.
Figure 4:
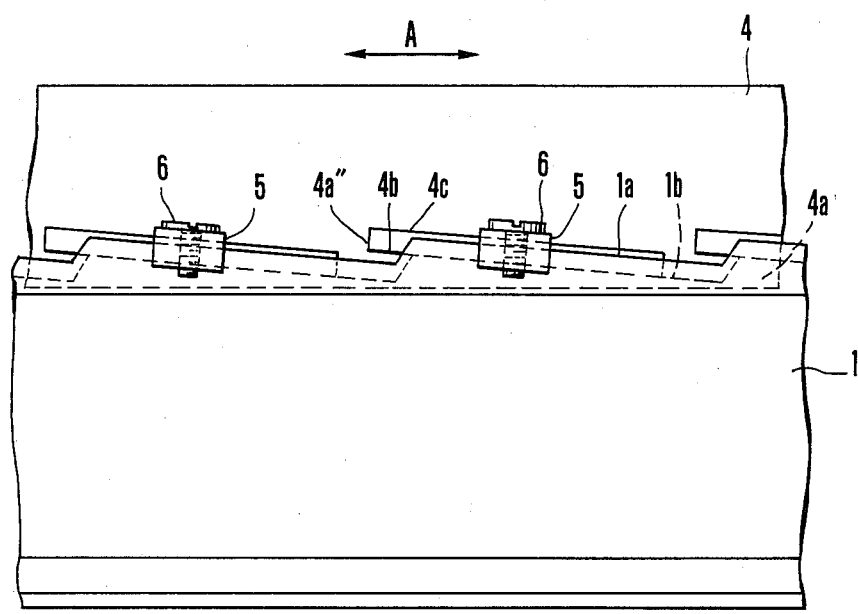
FIG. 4 is an expanded view of the cam portion of the relay barrel.
Figure 5:
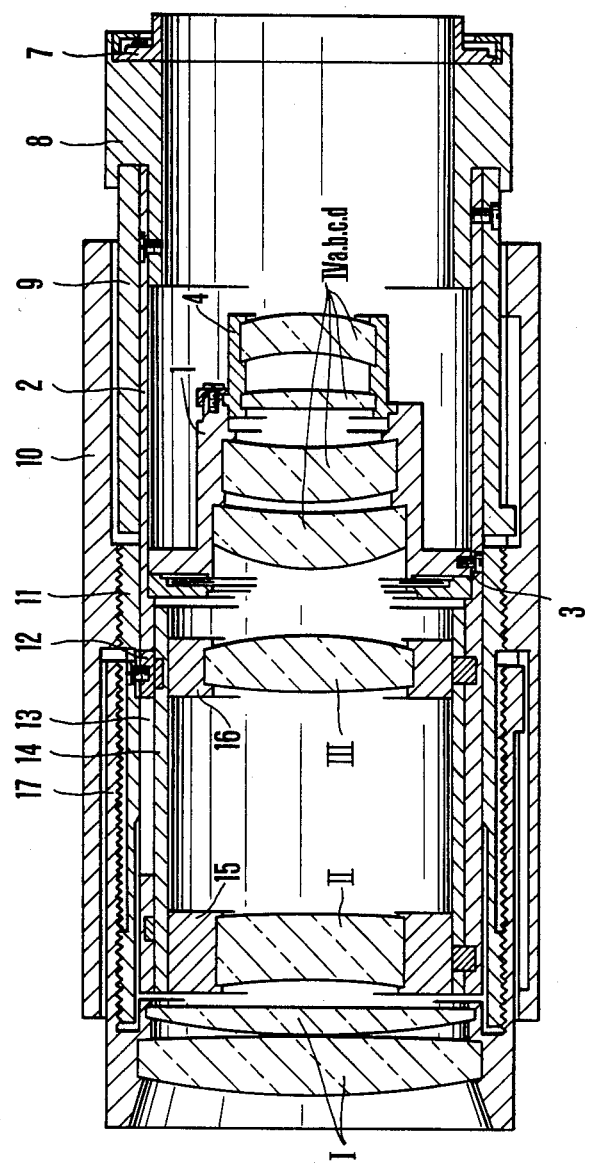
FIG. 5 is a longitudinal section view of a zoom lens mounting to which the invention is applied.

As shown in FIG. 5, the zoom lens comprises a focusing lens unit I, a variator lens II, a compensator lens III and a relay lens unit IV. A first barrel 1 holding a front part IVa and IVb of the relay lens unit IV, has a plurality of first camming surfaces 1a, 1a, 1a, ..., formed on one end surface, and a plurality of second camming surfaces 1b, 1b, 1b, ..., substantially similar to the aforesaid first camming surfaces, positioned axially inward from the aforesaid one end and displaced radially inward. The first camming surfaces 1a, 1a, ... are provided with a plurality of threaded screw-holes 1c, 1c, ..., or tap holes, for securing a second barrel 4. The inner periphery of the first barrel 1 has a fit surface 1d for the second barrel 4. The first barrel 1 is fixed to a secured barrel 2 by a screw 3. The second barrel 4 holds lenses IVc and IVd of the relay lens unit IV. The outer periphery of the barrel 4 is provided with projected portions 4a having third camming surfaces 4b, 4b, ... for engagement with the second camming surfaces 1b, 1b, ... of the aforesaid first barrel 1. The surfaces of the projected portion 4a opposite to the camming surfaces 4b, have fourth camming surfaces 4c, 4c, ... substantially similar to the third camming surface 4b. The width 4a'' of the projected portion 4a is formed wider than the step difference between the first and second camming surfaces 1a and 1b. A retainer member 5, for fixedly securing the second barrel 4 to the first barrel 1 under pressure, is formed with an L-shaped cross-section and has an over-bored hole for a screw fastener 6.

6 is the screw fasteners by which the retainer member 5 is secured to the first barrel 1; 7 is a mount member for position determination on a camera; 8 is a fixed barrel having a bayonet ring for coupling to the camera; 9 is an index ring; 10 is an operating ring which, upon axial movement, effects zooming and, upon rotation about the optical axis, effects focusing; 11 is a linearly movable barrel arranged to move axially when zooming; 12 is a key member for restraining the barrel 11 from rotation; 13 is a longitudinally elongated guide groove provided in the fixed barrel 2 and engaging with the key 12; 14 is a cam ring for controlling the movements of a variator cell 15 and a compensator cell 16; 17 is a focusing lens cell arranged, upon rotation of the operating ring 10, to move axially to effect focusing.

In the construction of the aforesaid embodiment, only main parts are described below.

When the second barrel 4 is inserted into the first barrel 1 at the inner peripheral fit surface 1d, the third camming surfaces 4b of the second barrel 4 abut on the second camming surfaces 1b of the first barrel 1. When the second barrel 4 is turned about the optical axis in a direction of arrow A with respect to the first barrel 1, the second barrel 4 axially moves according to the lead of the camming surfaces 4b, thereby adjusting the separation between the lenses IVb and IVc of the relay lens unit IV.

When the separation has been adjusted to a prescribed value, the retainer members 5 are put on the fourth camming surfaces 4c of the second barrel 4, and then fixedly secured to the first barrel 1 by the screw fasteners 6. Thus, the second barrel 4 is fixedly secured to the first barrel 1. At that time, the projected amount (l in FIG. 3) of the camming surface 4c of the second barrel 4 out of the first camming surface 1a of the first barrel 1 is ensured to be substantially constant at any angular position of the second barrel 4. Also when securing the second barrel 4 to the first barrel 1, as a slight clearance is provided between the inner peripheral fit surface 1d of the first barrel 1 and the outer diameter of the projected portions 4a of the second barrel 4, it is also possible to perform adjustment even in a direction radial to the optical axis.

As has been described above, by such a simple construction that the camming surface of the first barrel abuttingly contacts with the camming surface of the second barrel, an advantage is produced that the axial air separation between two optical elements in the respective barrels can be infinitely finely adjusted. Also because the second barrel can be fixedly secured in a direction parallel to the optical axis, there is another advantage that without causing deformation of the barrels and without badly influencing the optical performance, the adjusting and securing operation can be carried out easily and quickly.

Further, because of the presence of a radial clearance between the first and second barrels, another adjustment in a direction radial to the optical axis can be carried out at the same time.

In the above-described embodiment, since the axial adjustment of the position of the second barrel member 4 relative to the first barrel member is carried out by rotating the former about the optical axis, the leads of the first and second camming surfaces 1a and 1b are equalized so that the distance, l, (in FIG. 3) does not change despite the rotation of the second barrel member 4, and always has a constant value. Therefore, the tightening force of the retainer member 5 can be maintained constant.

Recently developed plastic molding techniques are able to finish molded products to a very high precision in size. On this account, the first camming surface 1a of the first barrel member 1 may be formed not to a cam, but to a plane-like end surface, and the above-identified distance, l, may be set to a minimum, while the front and rear camming surfaces 4b and 4c of the projected portions of the second barrel member 4 may be equalized to each other in the lead.

What is claimed is:

1. A lens mounting comprising:
(a) a first barrel member, a second barrel member, and at least one optical member held in said first and second barrel members, said first barrel member having a first cam provided in its end portion, and a second cam positioned on an inner side of said first cam in axially spaced relation;
(b) said second barrel member being fitted in said first barrel member and having projected portions on an outer periphery thereof, said second barrel member being provided, on same respective sides of said projected portions with portions abutting on said second cam of said first barrel member, whereby widths of said projected portions are made larger than the length of an interval between said first and second cams of said first barrel member; and
(c) a member for fixedly securing said first and second barrel members to each other, said member having a retainer for pressing said abutting portions of said second barrel member against said second cam of said first barrel member, and fasteners for tightening said retainer to said first barrel member.

2. A lens mounting comprising:
(a) a first barrel member having a first cam provided in an end surface of a tubular portion thereof, and a second cam positioned on an inner side of said first cam and arranged in a position axially spaced from said first cam by a prescribed distance;
(b) a second barrel member fitted in said first barrel member and provided with a projected portion on an outer periphery thereof having a surface in abutting contact with said second cam, said projected portion being provided with a third cam in the surface thereof which is in abutting contact with said second cam, and a fourth cam in a surface opposite to the surface abutting said second cam, whereby, a distance between said third and said fourth cam is made larger than the prescribed distance between the first and second cams; and
(c) a member for fixedly securing said first and second barrel members to each other, said member having an element for holding said second and said third cam in contact with each other under pressure, and another element for fixedly securing said holding element to said first barrel member.

3. A lens mounting comprising:
(a) a first barrel member having a cam positioned on an inner side of an end surface of a tubular portion thereof and provided in a position spaced from said end surface in a direction parallel to an optical axis by a prescribed distance;
(b) a second barrel member fitted in said first barrel member and provided with a projected portion having a surface for abutting contact with said cam of said first barrel member, the abutting contact surface of said projected portion being formed to a cam portion having a same lead as that of said first barrel member cam, and a width of said projected portion being made larger than the prescribed distance from said end surface of the tubular portion of said first barrel member to said cam; and
(c) a member for fixedly securing said first and second barrel members, said member having an element for pressing said projected portion of said second barrel member against said cam of said first barrel member, and another element for tightening said pressing element to said end surface of said first barrel member.

* * * * *